United States Patent
Iizuka et al.

(10) Patent No.: US 8,052,364 B2
(45) Date of Patent: Nov. 8, 2011

(54) COUPLING MEMBER AND PLASMA PROCESSING APPARATUS

(75) Inventors: Hachishiro Iizuka, Nirasaki (JP); Shojiro Yahata, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 355 days.

(21) Appl. No.: 12/412,939

(22) Filed: Mar. 27, 2009

(65) Prior Publication Data

US 2009/0245971 A1 Oct. 1, 2009

Related U.S. Application Data

(60) Provisional application No. 61/050,660, filed on May 6, 2008.

(30) Foreign Application Priority Data

Mar. 27, 2008 (JP) ................................. 2008-083972

(51) Int. Cl.
*F16B 25/10* (2006.01)
(52) U.S. Cl. ............. 411/392; 411/383; 411/900; 411/9
(58) Field of Classification Search .................. 411/392, 411/384, 383, 395, 403, 405, 411, 424, 8, 411/9, 900, 907; 156/345.51
See application file for complete search history.

(56) References Cited

U.S. PATENT DOCUMENTS

| | | | | |
|---|---|---|---|---|
| 4,906,154 A * | 3/1990 | Sheppard | ...................... | 411/392 |
| 5,098,240 A * | 3/1992 | Gapp et al. | ..................... | 411/424 |
| 5,102,276 A * | 4/1992 | Gourd | .......................... | 411/392 |
| 5,104,271 A * | 4/1992 | Lechler | ........................ | 411/166 |
| 6,179,537 B1 * | 1/2001 | Anders | ......................... | 411/392 |
| 7,175,626 B2 * | 2/2007 | Neff | ............................ | 606/86 A |
| 7,249,923 B2 * | 7/2007 | Niku | ............................ | 411/383 |
| 7,582,186 B2 * | 9/2009 | Strang et al. | ............. | 156/345.51 |
| 2006/0011300 A1 * | 1/2006 | Kim et al. | ................. | 156/345.51 |
| 2010/0003824 A1 * | 1/2010 | Kadkhodayan et al. | ...... | 438/710 |

* cited by examiner

*Primary Examiner* — Gary Estremsky
(74) *Attorney, Agent, or Firm* — Oblon, Spivak, McClelland, Maier & Neustadt, L.L.P.

(57) ABSTRACT

A coupling member is employed to couple components of a plasma processing apparatus which processes a substrate by using a plasma. The coupling member includes a threaded rod portion which passes through one component and is screwed and fixed to another component, a head portion which supports the one component and has a diameter larger than that of the threaded rod portion, and an elastic portion which is interposed between the threaded rod portion and the head portion, wherein the elastic portion has a larger strain to an external force than those of the threaded rod portion and the head portion.

12 Claims, 6 Drawing Sheets

FIG.10

COUPLING MEMBER AND PLASMA PROCESSING APPARATUS

FIELD OF THE INVENTION

The present invention relates to a plasma processing apparatus for performing a plasma etching process or the like on a substrate such as a semiconductor wafer and a substrate for LCD, and a coupling member preferably used in the plasma processing apparatus.

BACKGROUND OF THE INVENTION

Conventionally, there has been used a plasma processing apparatus for performing plasma processing on a substrate such as a semiconductor wafer or a substrate for a liquid crystal display (LCD). For example, in a manufacturing process of a semiconductor device, a plasma etching processing apparatus is being used to etch and remove an oxide film or the like formed on a semiconductor wafer serving as a substrate to be processed, thereby forming a fine electric circuit on the semiconductor wafer.

In the plasma processing apparatus, the semiconductor wafer is mounted on an upper surface of a lower electrode (susceptor) disposed in an airtightly sealed processing chamber. There have been known various types of means for generating a plasma in a processing chamber. For example, in an apparatus for generating a plasma by supplying a radio frequency (RF) power to a pair of parallel plate electrodes which are vertically provided to face each other, an upper electrode is disposed to face a lower electrode in a processing chamber. When a RF power is applied to one or both of the upper and lower electrodes, a plasma is generated in the processing chamber and etching is performed by the plasma (see, e.g., Patent Documents 1 to 3).

[Patent Document 1] Japanese Patent Laid-open Application No. 2004-95909

[Patent Document 2] Japanese Patent Laid-open Application No. 2005-236138

[Patent Document 3] Japanese Patent Laid-open Application No. 2006-165093

However, a lower surface of the upper electrode, a peripheral surface of the lower electrode and the like are exposed to the plasma generated in the processing chamber during the plasma processing. The upper and lower electrodes are made of conductive metal such as aluminum, and the metal exposed to the plasma may cause contamination. Accordingly, a protection member such as quartz is attached to the lower surface of the upper electrode, the peripheral surface of the lower electrode and the like. In this case, conventionally, the protection member is attached to the lower surface of the upper electrode, the peripheral surface of the lower electrode and the like by using screws made of heat resistant plastic such as Vespel (registered trademark) or the like.

In the meantime, there is a need to adjust the semiconductor wafer mounted on the lower electrode to have a desired temperature during the plasma processing. In this case, the lower electrode is first adjusted to a desired temperature, and then heat is transferred to the semiconductor wafer in order to adjust the temperature of the semiconductor wafer. Further, in order to maintain the temperature of the semiconductor wafer at the desired temperature, the upper electrode or the like is also adjusted to a desired temperature. Moreover, the plasma generated in the processing chamber or the like increases the temperature of a wall surface of the processing chamber, the upper electrode, or the like. In this manner, the temperatures of various components such as the upper electrode, the lower electrode and the like in the plasma processing apparatus are changed due to the plasma processing.

However, the respective components of the plasma processing apparatus are not formed of a same material, and each component is made of a material selected according to its use. For example, as described above, although the upper and lower electrodes are made of metal such as aluminum or the like, the protection members attached to their surfaces are made of quartz or the like. Accordingly, the respective components of the plasma processing apparatus have different linear expansion coefficients and receive thermal stress due to the change of temperature during the plasma processing.

Further, the thermal stress causes damage to the respective components of the plasma processing apparatus or the coupling members such as screws fixing the respective components due to the thermal stress. Further, the respective components may be deformed even though they are not damaged.

SUMMARY OF THE INVENTION

In view of the above, the present invention provides a coupling member capable of preventing components of a plasma processing apparatus from being damaged due to thermal stress.

In accordance with a first aspect of the present invention, there is provided a coupling member for coupling components of a plasma processing apparatus which processes a substrate by using a plasma, the coupling member comprising: a threaded rod portion which passes through one component and is screwed and fixed to another component; a head portion which supports the one component and has a diameter larger than that of the threaded rod portion; and an elastic portion which is interposed between the threaded rod portion and the head portion, wherein the elastic portion has a larger strain to an external force than those of the threaded rod portion and the head portion.

The coupling member may further include one or more holes reaching an inside of the threaded rod portion from a surface of the head portion through the head portion and the elastic portion. In this case, the number of the holes may be greater than one. Further, the holes may be provided at symmetrical positions with respect to a central axis of the threaded rod portion.

The elastic portion may include a deforming layer with a relatively large strain to the external force and a rigid layer with a relatively small strain to the external force.

Further, the elastic portion may be provided with a projection whose base end side has a relatively small diameter and whose leading end side has a relatively large diameter, and the head portion is provided with an engaging hole having a diameter equal to or larger than the diameter of the base end side and smaller than the diameter of the leading end side. Further, the elastic portion may be provided with a projection whose base end side has a relatively small diameter and whose leading end side has a relatively large diameter, and the threaded rod portion is provided with an engaging hole having a diameter equal to or larger than the diameter of the base end side and smaller than the diameter of the leading end side.

Further, the coupling member may further include a core member which passes through the elastic portion to connect the head portion with the threaded rod portion. In this case, the head portion may be rotatable with respect to the core member.

In accordance with a second aspect of the present invention, there is provided a plasma processing apparatus for processing a substrate by using a plasma, wherein components of the plasma processing apparatus are coupled to each other by the coupling member.

In the plasma processing apparatus, the components may include an upper electrode and a protection member attached to a lower surface of the upper electrode. In this case, the upper electrode may be made of aluminum and the protection member may be made of quartz.

In accordance with the aspects of the present invention, in the components of the plasma processing apparatus, thermal stress generated between one component and another component can be absorbed and reduced by deformation of the elastic portion provided in a coupling member which couples the one component with the another component. Such reduction of thermal stress can prevent the respective components of the plasma processing apparatus from being damaged and deformed.

BRIEF DESCRIPTION OF THE DRAWINGS

The objects and features of the present invention will become apparent from the following description of embodiments, given in conjunction with the accompanying drawings, in which.

DETAILED DESCRIPTION

Figure 1:
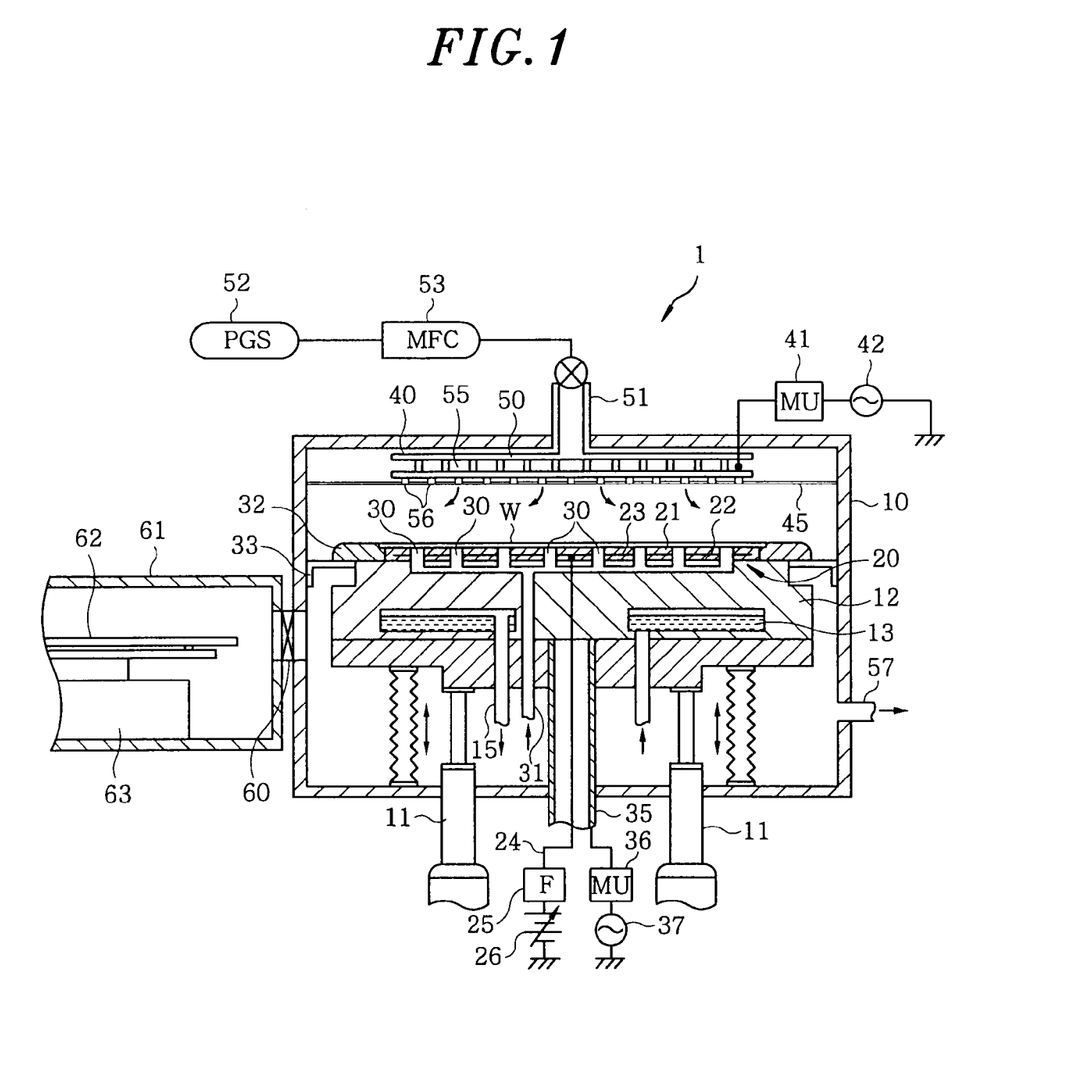
FIG. 1 is an explanatory view of a plasma processing apparatus in accordance with an embodiment of the present invention.
Figure 2:
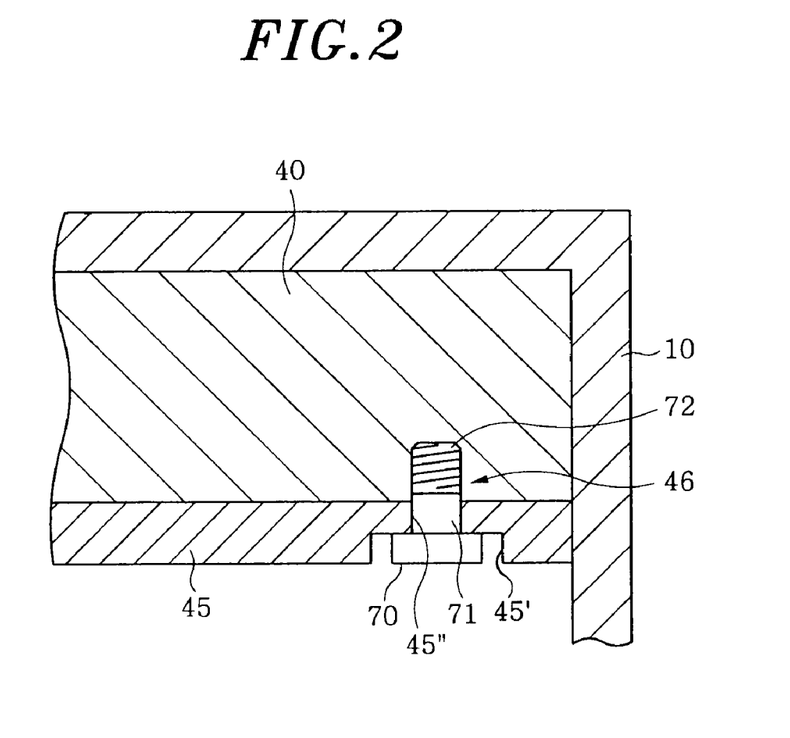
FIG. 2 is a partially-enlarged view showing an installation structure of a protection member for a lower surface of an upper electrode.

Hereinafter, embodiments of the present invention will be described with reference to the accompanying drawings which form a part hereof. FIG. 1 illustrates a plasma processing apparatus 1 in accordance with an embodiment of the present invention. FIG. 2 is a partially enlarged view showing an installation structure of a protection member 45 installed to a lower surface of an upper electrode 40. In the following description, there will be described the plasma processing apparatus 1 for plasma etching a semiconductor wafer W serving as a substrate to be processed. In the specification and the drawings, components having substantially same functions are denoted by like reference numerals and a repeated explanation thereof will be omitted.

The plasma processing apparatus 1 includes a cylindrical or rectangular processing chamber 10 made of a conductive material such as aluminum or the like. In the processing chamber 10, there is provided a substantially cylindrical lower electrode (susceptor) 12 which is configured to move up and down by an elevation mechanism 11 such as a motor and on which the wafer W serving as a substrate is mounted. The lower electrode 12 is made of a conductive material such as aluminum or the like. A heat transfer medium circulation passage 13 serving as a temperature controlling mechanism is installed in the lower electrode 12.

A heat transfer medium adjusted to an appropriate temperature by a temperature control unit (not shown) is introduced into the heat transfer medium circulation passage 13 via a heat transfer medium introduction pipe 15. The heat transfer medium introduced from the heat transfer medium introduction pipe 15 is circulated in the heat transfer medium circulation passage 13 to thereby adjust the lower electrode 12 to a desired temperature. Further, heat of the lower electrode 12 is transferred to the wafer W mounted on the upper surface of the lower electrode 12 such that the wafer W is adjusted to have a desired temperature.

Further, a cooling jacket, a heater or the like may be used as a temperature control mechanism for adjusting the temperature of the lower electrode 12.

An electrostatic chuck 20 for electrostatically adsorbing the wafer W is formed at an upper portion of the lower electrode 12. The electrostatic chuck 20 has a disc shape having substantially the same diameter as that of the wafer W. The electrostatic chuck 20 has a structure in which a conductive film 23 such as a copper foil or the like is interposed between two films 21 and 22 made of a polymer insulating material such as polyimide resin or the like. The conductive film 23 is connected to a high voltage power source 26 via a wire 24 and a filter (F) 25 such as a coil. During the plasma processing, a high voltage power (DC voltage) with its high frequency cut off by the filter 25 is applied from the high voltage power source 26 to the conductive film 23. The wafer W is electrostatically adsorbed on the upper surface of the lower electrode 12 (i.e., the upper surface of the electrostatic chuck 20) by a Coulomb force produced by the high voltage power applied to the conductive film 23.

A plurality of thermally conductive gas supply holes 30 through which a thermally conductive gas is supplied toward a backside of the wafer W are formed at plural places on the upper surface of the lower electrode 12. A thermally conductive gas supply pipe 31 is connected to the thermally conductive gas supply holes 30, and the thermally conductive gas such as helium is supplied at a pressure of, e.g., 5 Torr or more, from a gas source (not shown) into a minute space formed between the upper surface of the lower electrode 12 and the backside of the wafer W. Thus, heat is efficiently transferred from the upper surface of the lower electrode 12 to the wafer W.

An annular focus ring 32 is disposed around the upper surface of the lower electrode 12 in a manner to surround the circumference of the wafer W mounted on the upper surface of the lower electrode 12. The focus ring 32 is made of a conductive material or an insulating material which does not attract reactive ions, and operates to effectively introduce the reactive ions only to the wafer W disposed at the inside of the focus ring 32.

A gas exhaust ring 33 having a plurality of baffle holes is interposed between the lower electrode 12 and the inner wall of the processing chamber 10. A process gas is uniformly evacuated from the processing chamber 10 by using the exhaust ring 33.

A power feed rod 35 formed of a hollow conductor is connected to a lower surface of the lower electrode 12. A first RF power supply 37 is connected to the power feed rod 35 via a matching unit (MU) 36 including a blocking capacitor or the like. For the plasma processing, a RF power having a frequency of, e.g., 2 MHz is applied from the first RF power supply 37 to the lower electrode 12.

An upper electrode 40 is disposed above the lower electrode 12. The upper electrode 40 is made of a conductive material such as aluminum or the like. The upper surface of the lower electrode 12 faces the lower surface of the upper electrode 40 in parallel at a predetermined interval. A gap between the upper surface of the lower electrode 12 and the lower surface of the upper electrode 40 is adjusted by using the elevation mechanism 11.

A second RF power supply 42 is connected to the upper electrode 40 via a matching unit (MU) 41 including a blocking capacitor or the like. For the plasma processing, a RF power having a frequency of, e.g., 60 MHz, is applied from the second RF power supply 42 to the upper electrode 40. Thus, a plasma is generated in the processing chamber 10 by applying the RF powers from the first RF power supply 37 and the second RF power supply 42 to the lower electrode 12 and the upper electrode 40, respectively.

A protection member 45 is attached to the lower surface of the upper electrode 40. The protection member 45 is made of, e.g., quartz, and covers the entire lower surface of the upper electrode 40 such that the lower surface of the upper electrode 40 is not exposed to the inside of the processing chamber 10.

As shown in FIG. 2, the protection member 45 is fixed to the lower surface of the upper electrode 40 by using a coupling member 46. On the lower surface of the protection member 45 is formed a recess portion 45' to receive a head portion 70 of the coupling member 46. A configuration of the coupling member 46 will be described in detail later.

A hollow portion 50 is formed inside the upper electrode 40. A process gas supply pipe 51 is connected to the hollow portion 50. A process gas supplied from a process gas source (PGS) 52 is introduced into the hollow portion 50 of the upper electrode 40 via the process gas supply pipe 51 while its flow rate is controlled by a mass flow controller (MFC) 53. A gas including, e.g., tetrafluoromethane ($CF_4$), difluoromethane ($CH_2F_2$), oxygen ($O_2$) or the like is used as the process gas.

A baffle plate 55 for facilitating uniform diffusion of the process gas is disposed in the hollow portion 50. The baffle plate 55 includes a plurality of small holes. A plurality of process gas injection openings 56 are formed on the lower surface of the upper electrode 40 to inject the process gas from the hollow portion 50 into the processing chamber 10.

A gas exhaust pipe 57 communicating with a gas exhaust system including a vacuum pump and so on is connected to a lower side of the processing chamber 10. The internal pressure of the processing chamber 10 is reduced to, e.g., 100 mTorr or below through the gas exhaust pipe 57.

A load lock chamber 61 is placed at a lateral side of the processing chamber 10 via a gate valve 60. A transfer mechanism 63 having a transfer arm 62 is installed in the load lock chamber 61. When the gate valve 60 is opened, the wafer W is carried into and out of the processing chamber 10 by using the transfer arm 62.

Figure 3:
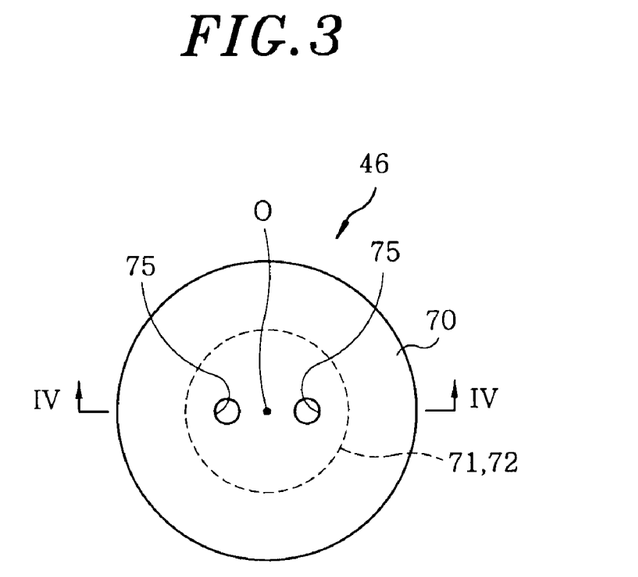
FIG. 3 is a plan view of a coupling member.
Figure 4:
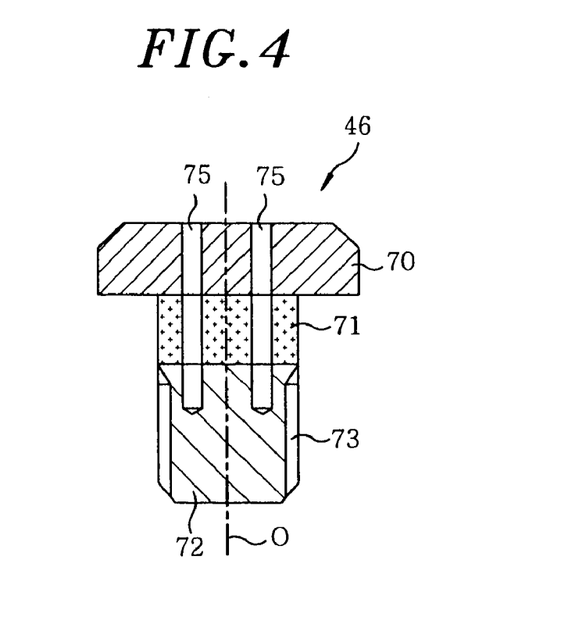
FIG. 4 is a longitudinal cross sectional view of the coupling member, which is taken along the line IV-IV in FIG. 3.

FIG. 3 is a plan view of the coupling member 46 and FIG. 4 is a longitudinal cross sectional view of the coupling member 46, which is taken along the line IV-IV of FIG. 3. As shown in FIGS. 3 and 4, the coupling member 46 includes the head portion 70, an elastic portion 71 and a threaded rod portion 72. The elastic portion 71 and the threaded rod portion 72 have a cylindrical shape with the substantially same diameter. A thread 73 is formed on a circumferential surface of the threaded rod portion 72. The head portion 70 has a disc shape with a diameter larger than those of the elastic portion 71 and the threaded rod portion 72. The head portion 70, the elastic portion 71 and the threaded rod portion 72 have a common central axis O. The coupling member 46 is integrally formed as a single body by bonding an upper surface of the elastic portion 71 to a central portion of a lower surface of the head portion 70 and bonding an upper surface of the threaded rod portion 72 to a lower surface of the elastic portion 71. The bonding of the elastic portion 71 to the head portion 70 and the bonding of the threaded rod portion 72 to the elastic portion 71 are achieved by, e.g., vulcanization bonding.

The head portion 70 and the threaded rod portion 72 are made of, e.g., heat resistant plastic such as Vespel (registered trademark), or the like, which is a material having a smaller strain to an external force than that of the elastic portion 71. The elastic portion 71 is made of, e.g., an elastic material such as rubber and resin, which is a material having a larger strain to an external force than those of the head portion 70 and the threaded rod portion 72.

Two holes 75 are formed on the surface (upper surface) of the head portion 70 of the coupling member 46. These holes 75 are formed to have a depth reaching the inside of the threaded rod portion 72 from the surface of the head portion 70 through the head portion 70 and the elastic portion 71.

Both of the two holes 75 are in parallel to the central axis O and the distances between the two holes 75 and the central axis O are identical. Further, the two holes 75 are symmetrically formed with respect to the central axis O. That is, the two holes 75 are arranged at opposite positions of 180° around the central axis O.

Figure 5:
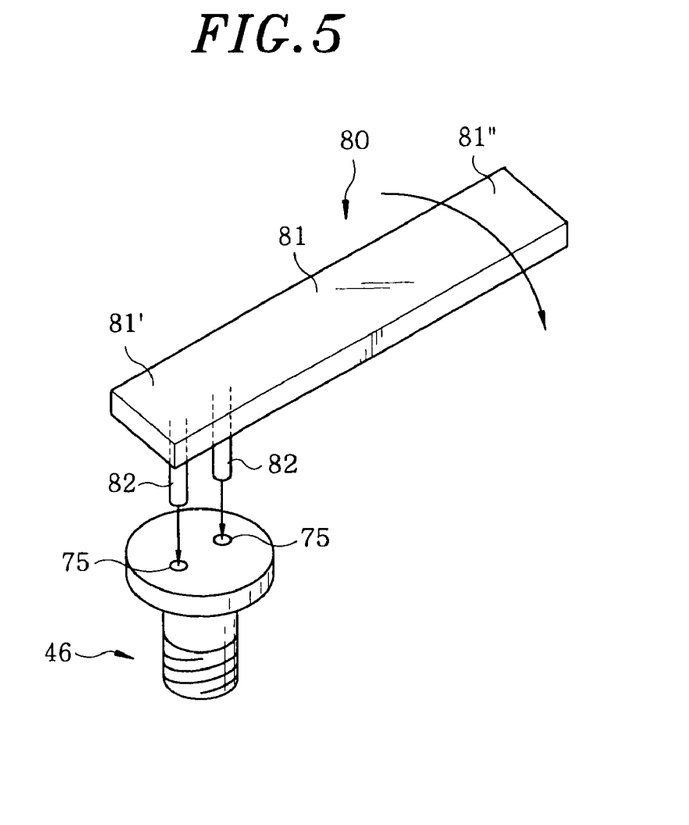
FIG. 5 is an explanatory view of a tool for rotating a coupling member.

FIG. 5 is an explanatory view of a tool 80 for rotating the coupling member 46. The tool 80 includes a bar-shaped lever 81 and two projections 82 attached to a leading end portion 81' of the lever 81. The two projections 82 are provided at positions such that they are inserted into the two holes 75 of the coupling member 46, respectively. Further, both of the two projections 82 have a length by which they are inserted into the deepest portions of the two holes 75 of the coupling member 46, respectively.

When the protection member 45 is attached to the lower surface of the upper electrode 40 as shown in FIG. 2, the threaded rod portion 72 of the coupling member 46 is passed through an opening 45" formed in the protection member 45, and the threaded rod portion 72 is screwed and fixed to the upper electrode 40 by rotating the coupling member 46. In this case, the projections 82 of the tool 80 are inserted into the holes 75 of the coupling member 46, respectively, and the threaded rod portion 72 can be easily screwed by rotating a base end portion 81" of the lever 81. Further, the moment applied to the lever 81 is directly exerted on the threaded rod portion 72 of the coupling member 46 by inserting the projections 82 up to the deepest portions of the two holes 75 of the coupling member 46, respectively, and rotating the leading end portion 81' of the lever 81. Accordingly, the threaded rod portion 72 of the coupling member 46 can be reliably screwed and fixed to the upper electrode 40.

In this manner, as the threaded rod portion 72 of the coupling member 46 is screwed and fixed to the upper electrode 40, the lower surface of the protection member 45 is supported by the head portion 70 of the coupling member 46. Further, as shown in FIG. 2, in a state in which the lower surface of the protection member 45 is supported by the head portion 70 of the coupling member 46, the head portion 70 of the coupling member 46 is received in the recess portion 45' formed on the lower surface of the protection member 45.

In the plasma processing apparatus 1 configured as above, when the gate valve 60 is opened, the wafer W to be processed is transferred into the processing chamber 10 by using the transfer arm 62 and is mounted on the upper surface of the lower electrode 12. Thereafter, the transfer arm 62 is retreated from the processing chamber 10 and the gate valve 60 is closed.

Next, in the processing chamber 10, plasma processing is performed on the wafer W mounted on the upper surface of the lower electrode 12. During the plasma processing, an internal pressure of the processing chamber 10 is reduced to, e.g., 100 mTorr through the gas exhaust pipe 57. The process gas supplied from the process gas source 52 is uniformly supplied into the processing chamber 10 through the process gas injection openings 56 formed on the lower surface of the upper electrode 40.

Then, a RF power of, e.g., 2 MHz is applied to the lower electrode 12 from the first RF power supply 37, while a RF power of, e.g., 60 MHz is applied to the upper electrode 40 from the second RF power supply 42. Accordingly, the process gas supplied into the processing chamber 10 is converted into a plasma to perform plasma processing on the wafer W.

Further, during the plasma processing, a high voltage power having a predetermined DC voltage level is applied from the high voltage power source 26 to the conductive film 23 of the electrostatic chuck 20. Accordingly, the wafer W is electrostatically adsorbed on the upper surface of the lower electrode 12 by a Coulomb force produced from the high voltage power applied to the electrostatic chuck 20.

When the plasma processing in the processing chamber 10 is ended, the pressure reduction through the gas exhaust pipe 57 is stopped and the supply of the process gas into the processing chamber 10 is also stopped. Further, the application of the radio frequency (RF) power to the lower electrode 12 and the upper electrode 40 is stopped and the application of the high voltage (HV) power to the lower electrode 12 (electrostatic chuck 20) is also stopped.

When the plasma processing for the wafer W is ended, the gate valve 60 is opened and the processed wafer W is transferred out of the processing chamber 10 by using the transfer arm 62.

In this plasma processing apparatus 1, during the plasma processing, each of the components such as the lower electrode 12, the upper electrode 40, the processing chamber 10 and the like is adjusted to a desired temperature in order to set the wafer W mounted on the lower electrode 12 to a required temperature. Further, heat generated according to the plasma processing changes the temperatures of the respective components, and the respective components undergo thermal expansions due to the temperature changes.

For example, the protection member 45 and the upper electrode 40 that are the components of the plasma processing apparatus 1 will be described in detail. The protection member 45 is made of, e.g., quartz whose linear expansion coefficient is 5.9e-7/° C. (between 20 and 100° C.) or so. On the other hand, the upper electrode 40 is made of, e.g., aluminum whose linear expansion coefficient is 23.8e-6/° C. (between 20 and 100° C.). Accordingly, when the protection member 45 and the upper electrode 40 undergo thermal expansion due to the temperature change, the amount of expansion of the upper electrode 40 becomes larger than that of the protection member 45.

In the plasma processing apparatus 1 shown in this embodiment, a difference between the amount of expansion of the upper electrode 40 and that of the protection member 45 is compensated by the coupling member 46 attaching the protection member 45 to the lower surface of the upper electrode 40. In other words, the elastic portion 71 made of an elastic material such as rubber, resin or the like is interposed between the threaded rod portion 72 screwed and fixed to the upper electrode 40 and the head portion 70 supporting the lower surface of the protection member 45. Accordingly, when there is a difference in the amount of thermal expansion between the protection member 45 and the upper electrode 40, the elastic portion 71 is deformed to reduce thermal stress applied between the protection member 45 and the upper electrode 40. Such reduction of thermal stress prevents the protection member 45 and the upper electrode 40 from being damaged or deformed. Further, the deformation of the elastic portion 71 can prevent the coupling member 46 from being damaged by preventing excessive stress from being applied to the entire of the coupling member 46.

Although the preferred embodiment of the present invention has been described, the present invention is not limited to the above embodiment. It is to be understood by those skilled in the art that various modifications and changes may be made without departing from the spirit and scope of the claims and fall within the technical scope of the present invention.

Figure 6:
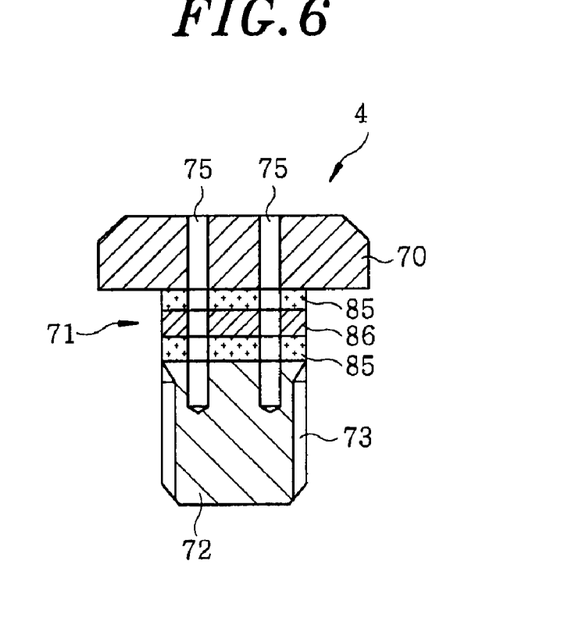
FIG. 6 is a longitudinal cross sectional view of a coupling member having an elastic portion including a deforming layer and a rigid layer.

As shown in FIG. 6, the elastic portion 71 of the coupling member 46 may include one or more, e.g., two deforming layers 85 having a relatively large strain to an external force and a rigid layer 86 disposed, e.g., between the deforming layers 85 and having a relatively small strain to an external force. In this case, the deforming layer 85 may be made of, e.g., an elastic material such as rubber, resin or the like, while the rigid layer 86 may be made of, e.g., heat resistant plastic such as Vespel (registered trademark), metal or the like. Thus, it is possible to increase the entire strength of the coupling member 46 by partially providing the rigid layer 86 in the elastic portion 71 of the coupling member 46.

Figure 7:
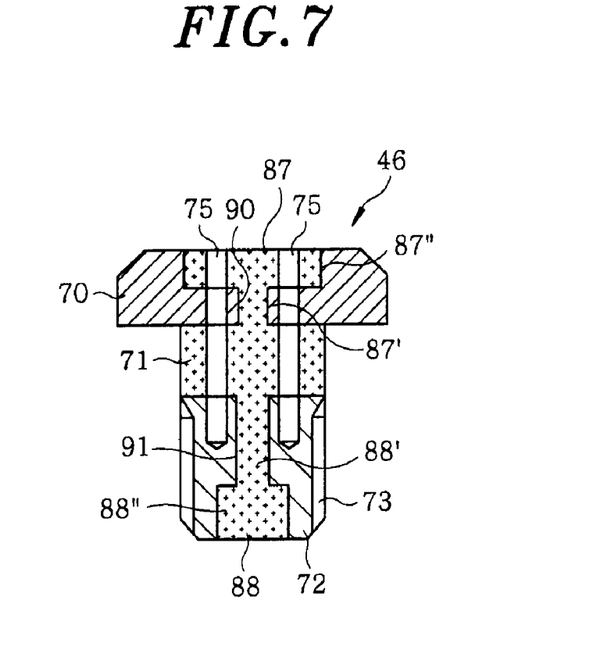
FIG. 7 is a longitudinal cross sectional view of a coupling member, wherein a head portion and an elastic portion are jointed to each other and the elastic portion and a threaded rod portion are jointed to each other by using projections.

As shown in FIG. 7, projections 87 and 88 may be formed at the upper and lower sides of the elastic portion 71, respectively, and bonding of the head portion 70 to the elastic portion 71 and bonding of the elastic portion 71 to the threaded rod portion 72 may be carried out by using the projections 87 and 88. The upper projection 87 has a base end portion 87' with a relatively small diameter and a leading end portion 87" with a relatively large diameter. An engaging hole 90 with a diameter equal to or larger than the diameter of the base end portion 87' of the projection 87 and smaller than the diameter of the leading end portion 87" is formed in the head portion 70. As the leading end portion 87" of the projection 87 is passed through the engaging hole 90 of the head portion 70 and the leading end portion 87" is widened at the upper surface of the head portion 70, the head portion 70 can be joined to the elastic portion 71. In addition to the junction of the head portion 70 and the elastic portion 71 by using the projection 87, the head portion 70 and the elastic portion 71 may further be bonded to each other by vulcanization bonding.

Similarly, the lower projection 88 also has a base end portion 88' with a relatively small diameter and a leading end portion 88" with a relatively large diameter. An engaging hole 91 with a diameter equal to or larger than the diameter of the base end portion 88' of the projection 88 and smaller than the diameter of the leading end portion 88" is formed in the threaded rod portion 72. As the leading end portion 88" of the projection 88 is passed through the engaging hole 91 of the threaded rod portion 72 and the leading end portion 88" is widened at the lower surface of the threaded rod portion 72, the threaded rod portion 72 can be joined to the elastic portion 71. In addition to the junction of the threaded rod portion 72 and the elastic portion 71 by using the projection 88, the threaded rod portion 72 and the elastic portion 71 may further be bonded to each other by vulcanization bonding.

Figure 8:
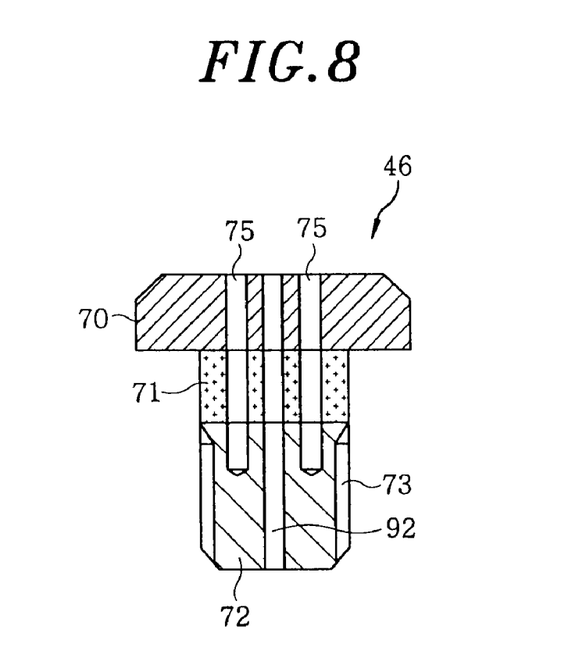
FIG. 8 is a longitudinal cross sectional view of a coupling member provided with a core member.

As shown in FIG. 8, a core member 92 passing through the elastic portion 71 may be disposed in the coupling member 46 to connect the head portion 70 with the threaded rod portion 72. A flexible member such as a wire, spring or the like may be employed as the core member 92, and the head portion 70 and the threaded rod portion 72 are fixed to the top end and bottom end of the core member 92, respectively, by, e.g., welding or the like. Thus, as the head portion 70 is connected to the threaded rod portion 72 by using the core member 92, it is possible to prevent the elastic portion 71 from extending in an axial direction of the coupling member 46. For example, when the protection member 45 is attached to the lower surface of the upper electrode 40 by using the coupling member 46, it is possible to reliably support a load of the protection member 45 and reliably attach the protection member 45 to the lower surface of the upper electrode 40 by suppressing extension of the elastic portion 71.

Figure 9:
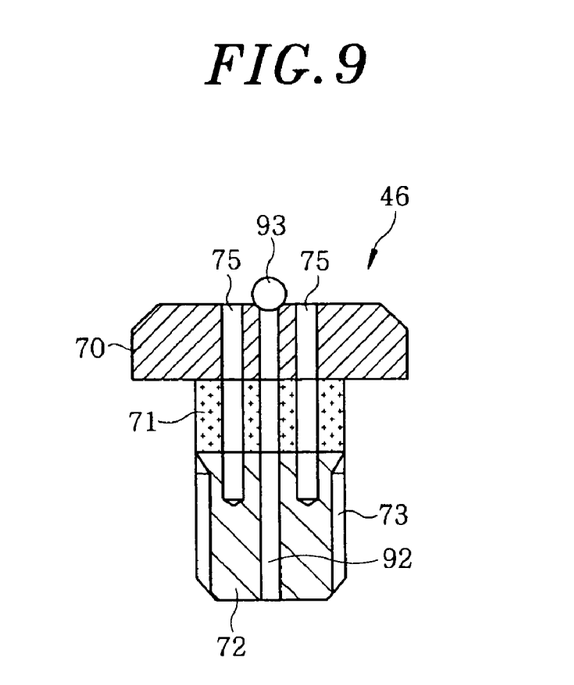
FIG. 9 is a longitudinal cross sectional view of a coupling member provided with a spherical stopper disposed on the core member.

As shown in FIG. 9, a spherical stopper 93 may be provided on the core member 92 to press or restrict the top surface of the head portion 70. In this case, the head portion 70 is not fixedly connected to the upper end of the core member 92 and the distance between the top surface of the head portion 70 and the bottom surface of the threaded rod portion 72 is maintained constant along the central axis O of the coupling member 46 by the stopper 93. Thus, the head portion 70 is allowed to be rotated around the stopper 93. With this configuration, since the head portion 70 can be freely rotated with respect to the core member 92, the head portion 70 can absorb, e.g., inclination of the protection member 45 or the like.

Although the two holes 75 for rotating the coupling member 46 are provided in the above embodiment, the present invention is not limited thereto. For example, three or more holes 75 may be provided at symmetrical positions with respect to the central axis O of the coupling member 46.

Figure 10:
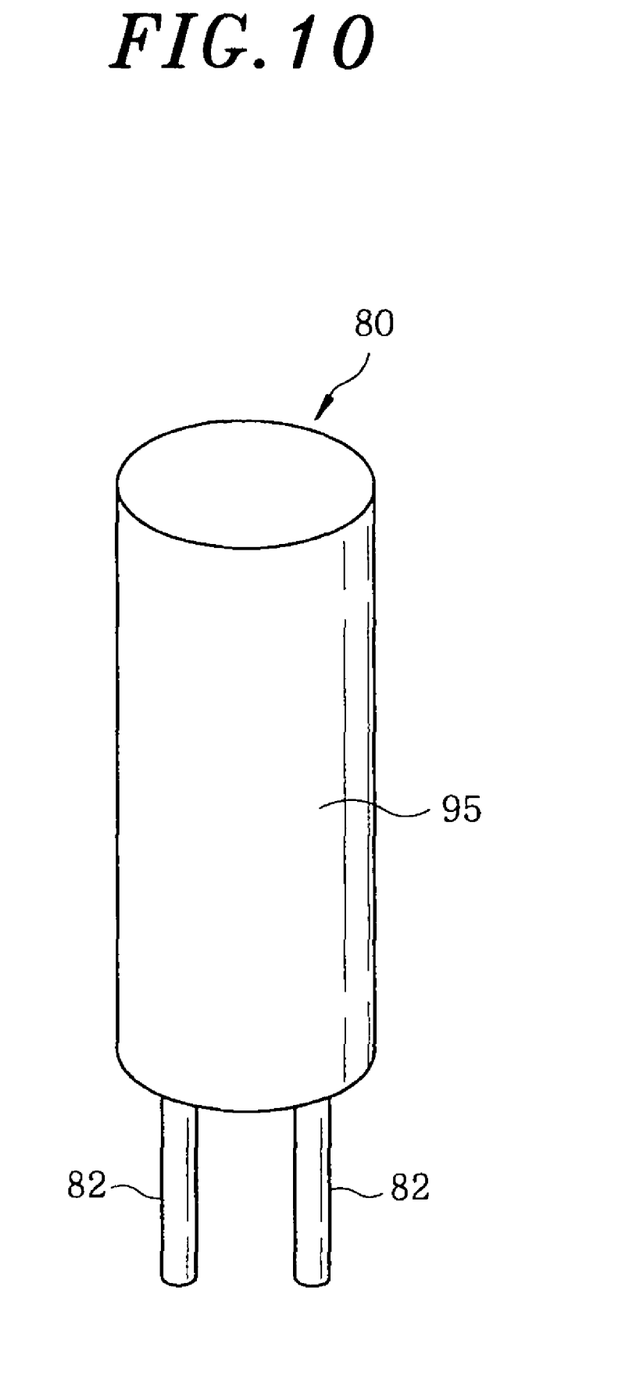
FIG. 10 is an explanatory view of a tool different from that shown in FIG. 5.

The tool 80 having the bar-shaped lever 81 has been illustrated in FIG. 5. However, the tool 80 may be considered to have various forms. For example, as shown in FIG. 10, projections 82 may be attached to a leading end portion of a round bar-shaped axis 95. When the tool 80 with the projections 82 attached to the leading end portion of the axis 95 is used, the coupling member 46 can be rotated even in a limited narrow space.

The protection member 45 and the upper electrode 40 have been illustrated as the components of the plasma processing apparatus 1. However, components of the plasma processing apparatus 1 to which the present invention is applied are not limited thereto. For example, the lower electrode 12 or the processing chamber 10 also includes a plurality of components. The present invention may be also applied to the components of the lower electrode 12 and the processing chamber 10.

While the plasma processing apparatus that generates a plasma by supplying RF power to a pair of parallel plate electrodes has been illustrated in the above embodiment, the present invention may be also applied to a plasma processing apparatus that generates a plasma by using a microwave. Further, although the plasma etching apparatus has been illustrated as an example, the present invention may be also applied to various kinds of apparatuses, which perform plasma processing in a processing chamber, e.g., a plasma CVD apparatus, an ashing apparatus, etc. Further, a substrate to be processed by using the plasma processing apparatus of the present invention may be any of a semiconductor wafer, an organic EL substrate, a substrate for flat panel display (FPT) and so on.

The present invention can be applied to, e.g., a manufacturing field of semiconductor devices.

While the invention has been shown and described with respect to the embodiments, it will be understood by those skilled in the art that various changes and modification may be made without departing from the scope of the invention as defined in the following claims.

What is claimed is:

1. A coupling member for coupling components of a plasma processing apparatus which processes a substrate by using a plasma, the coupling member comprising:
   a threaded rod portion which is adapted to pass through one component and to be screwed and fixed to another component;
   a head portion which is adapted to support the one component and has a diameter larger than that of the threaded rod portion;
   an elastic portion which is interposed between the threaded rod portion and the head portion; and
   two or more holes reaching an inside of the threaded rod portion from a surface of the head portion through the head portion and the elastic portion,
   wherein the elastic portion has a larger strain to an external force than those of the threaded rod portion and the head portion.

2. The coupling member of claim 1, wherein the holes are provided at symmetrical positions with respect to a central axis of the threaded rod portion.

3. The coupling member of claim 1, wherein the elastic portion includes a deforming layer with a relatively large strain to the external force and a rigid layer with a relatively small strain to the external force.

4. The coupling member of claim 1, wherein the elastic portion is provided with a projection whose base end side has a relatively small diameter and whose leading end side has a relatively large diameter, and the head portion is provided with an engaging hole having a diameter equal to or larger than the diameter of the base end side and smaller than the diameter of the leading end side.

5. The coupling member of claim 1, wherein the elastic portion is provided with a projection whose base end side has a relatively small diameter and whose leading end side has a relatively large diameter, and the threaded rod portion is provided with an engaging hole having a diameter equal to or larger than the diameter of the base end side and smaller than the diameter of the leading end side.

6. The coupling member of claim 1, further comprising a core member which passes through the elastic portion to connect the head portion with the threaded rod portion.

7. The coupling member of claim 6, wherein the head portion is rotatable with respect to the core member.

8. The coupling member of claim 6, wherein the head portion and the threaded rod portion are fixed to the core member.

9. A plasma processing apparatus for processing a substrate by using a plasma, wherein components of the plasma processing apparatus are coupled to each other by the coupling member described in claim 1.

10. The plasma processing apparatus of claim 9, wherein the components include an upper electrode and a protection member attached to a lower surface of the upper electrode.

11. The plasma processing apparatus of claim 10, wherein the upper electrode is made of aluminum and the protection member is made of quartz.

12. A coupling member for coupling components of a plasma processing apparatus which processes a substrate by using a plasma, the coupling member comprising:

a threaded rod portion which is adapted to pass through one component and to be screwed and fixed to another component;

a head portion which is adapted to support the one component and has a diameter larger than that of the threaded rod portion;

an elastic portion which is interposed between the threaded rod portion and the head portion; and a core member which passes through the elastic portion to connect the head portion with the threaded rod portion, wherein the elastic portion has a larger strain to an external force than those of the threaded rod portion and the head portion, and wherein the head portion is rotatable with respect to the core member.

* * * * *